(12) United States Patent
Peng et al.

(10) Patent No.: US 7,263,124 B2
(45) Date of Patent: Aug. 28, 2007

(54) SCALABLE CODING SCHEME FOR LOW LATENCY APPLICATIONS

(75) Inventors: Wen-Hsiao Peng, Palo Alto, CA (US); Yen-Kuang Chen, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 721 days.

(21) Appl. No.: 09/965,213

(22) Filed: Sep. 26, 2001

(65) Prior Publication Data

US 2003/0058936 A1 Mar. 27, 2003

(51) Int. Cl.
*H04N 7/12* (2006.01)
*G06K 9/36* (2006.01)

(52) U.S. Cl. .................. 375/240.03; 382/251
(58) Field of Classification Search .......... 375/240.12, 375/240.16, 240.21, 240, 240.23, 240.03; 708/203; 348/410.1; 382/251
See application file for complete search history.

(56) References Cited

U.S. PATENT DOCUMENTS

| | | | | |
|---|---|---|---|---|
| 4,785,349 A | * | 11/1988 | Keith et al. | 375/240.23 |
| 5,988,863 A | * | 11/1999 | Demos | 708/203 |
| 6,118,817 A | * | 9/2000 | Wang | 375/240.03 |
| 6,275,531 B1 | * | 8/2001 | Li | 375/240.12 |
| 6,510,177 B1 | * | 1/2003 | De Bonet et al. | 375/240.16 |
| 6,700,933 B1 | * | 3/2004 | Wu et al. | 375/240.16 |
| 6,728,317 B1 | * | 4/2004 | Demos | 375/240.21 |
| 6,788,740 B1 | * | 9/2004 | van der Schaar et al. | 375/240 |

OTHER PUBLICATIONS

H. Jiang, et al., "Experiments on Using Post-Clip Addition in MPEG-4 FGS Video Coding," International Organisation For Standardisation, ISO/IEC JTC1/SC29/WG11 M5669, Noordwijkerhout, pp. 1-8, Mar. 2000.
S. Li, et al., "Experimental Results with Progressive Fine Granularity Scalable (PFGS) Coding," International Organisation For Standardisation, ISO/IEC JTC1/SC29/WG11 MPEG99/m5742, 14 pages Mar. 2000.
"Information Technology-Coding of Audio- Visual Object-Part 2: Visual," International Organisation For Standardisation, ISO/IEC JTC1/SC29/WG11 N3315, Proposed Draft Amendment (PDAM 4), 59 pages, Apr. 11, 2000.
"FGS Core Experiments," International Organisation For Standardisation, ISO/IEC JTC1/SC29/WG11 N3096, 20 pages, Maui, Dec. 1999.

* cited by examiner

*Primary Examiner*—Gims Philippe
(74) *Attorney, Agent, or Firm*—Blakely, Sokoloff, Taylor & Zafman LLP

(57) ABSTRACT

Fractional parts of quantized video coefficients are used as enhancement layers when encoding a video steam. This use of the fractional parts allows the reuse of decoding components.

44 Claims, 13 Drawing Sheets

SCALABLE CODING SCHEME FOR LOW LATENCY APPLICATIONS

FIELD OF THE INVENTION

This invention relates generally to video encoding and decoding, and more particularly to a scalable coding scheme for video encoding and decoding.

BACKGROUND OF THE INVENTION

Video is principally a series of still pictures, one shown after another in rapid succession, to give a viewer the illusion of motion. Before it can be transmitted over a communication channel, analog video may need to be converted, or "encoded," into a digital form. In digital form, the video data are made up of a series of bits called a "bitstream." When the bitstream arrives at the receiving location, the video data are "decoded," that is, converted back to a viewable form. Due to bandwidth constraints of communication channels, video data are often "compressed" prior to transmission on a communication channel. Compression may result in a degradation of picture quality at the receiving end.

A compression technique that partially compensates for loss (degradation) of quality involves separating the video data into a "base layer" and one or more "enhancement layers" prior to transmission. The base layer includes a rough version of the video sequence and may be transmitted using comparatively little bandwidth. The enhancement layers typically capture the difference between the base layer and the original input video picture. Each enhancement layer also requires little bandwidth, and one or more enhancement layers may be transmitted at the same time as the base layer. At the receiving end, the base layer may be recombined with the enhancement layers during the decoding process. The enhancement layers provide correction to the base layer, consequently improving the quality of the output video. Transmitting more enhancement layers produces better output video, but requires more bandwidth.

The enhancement layers may be ordered so that the most significant correction is made by the first enhancement layer, with subsequent enhancement layers providing less significant correction. In this way, the quality of the output video can be "scaled" by combining different numbers of the ordered enhancement layers with the base layer. The process of using ordered enhancement layers to scale the quality of the output video is referred to as "Fine Granularity Scalability" (FGS) and may result in a substantial saving of bandwidth.

Some compression methods and file formats have been standardized, such as the Motion Picture Experts Group (MPEG) standards of the International Organization for Standardization. One of the MPEG standards, MPEG-4, uses an FGS algorithm to produce a range of quality of output video suitable for use with various bandwidths. However, the amount of processing required with MPEG-4 FGS renders it unsuitable for applications that require low end-to-end delay, such as videoconferencing.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1A:
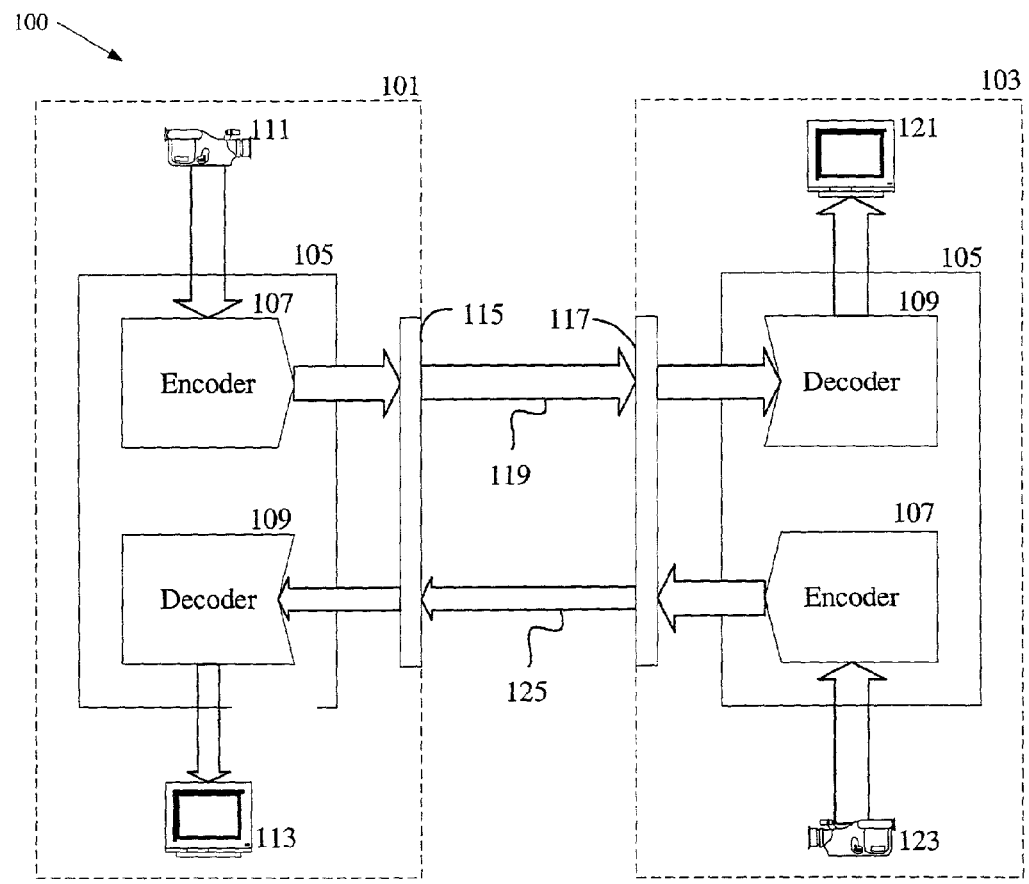
FIG. 1A is a block diagram illustrating a video conferencing system in accordance with the present invention.
Figure 1B:
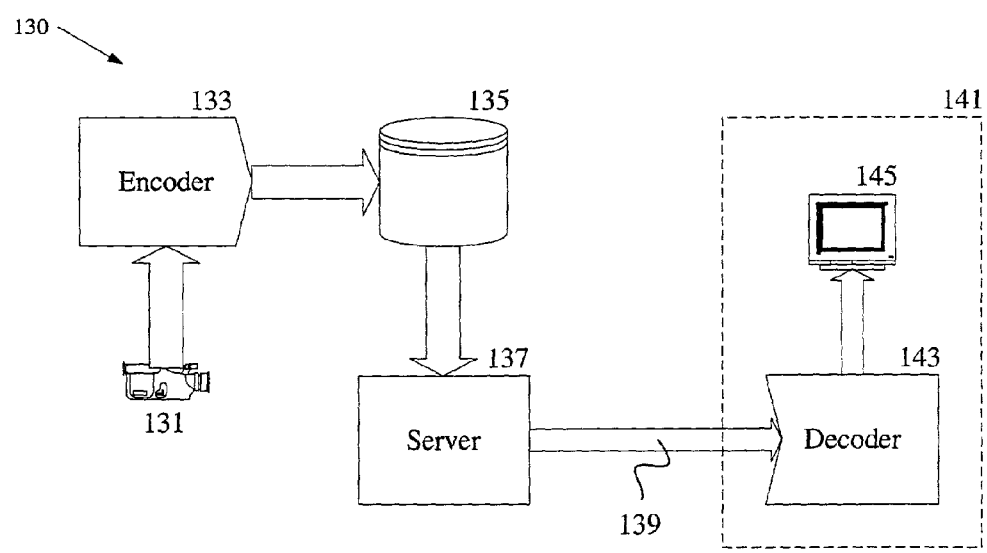
FIG. 1B is a block diagram illustrating a video streaming system in accordance with the present invention.

Two video systems in which embodiment of the invention may be practiced are shown in FIGS. 1A and 1B. FIG. 1A is a block diagram of a video conferencing system 100 in which the participant's video system 101, 103 contain an MPEG-4 FGS codec 105 that encodes and decodes video streams in accordance with embodiments of the invention described below. Video system 101 is connected to video system 103 through an asymmetric communications link that has more bandwidth in the channel 119 from video system 101 to video system 103 than the channel 125 from video system 103 to video system 101, such as an asymmetric digital subscriber line (ADSL) or digital cable connections. As shown, an encoder 107 in the codec 105 at video system 101 encodes a video signal from a camera 111 into a base layer bitstream and an enhancement layer bitstream and sends the bitstreams to a communications interface 115 for transmission to the video system 103. The communications interface 115 transmits the largest amount of bitstream data that can be handled by the channel 119. The bitstreams may be combined into a single bitstream through a multiplexer (not shown) before they are transmitted. When a communications interface 117 at video system 103 receives the bitstream, the bitstream is de-muxed, if necessary, and the base and enhancement layer bitstream are sent to a decoder 109 in the codec 105, where they are decoded into a video picture that is shown on a display 121. Similarly, the encoder 107 in the code 105 at video system 103 encodes a video signal from camera 123. However, because the channel 125 is of lower bandwidth than the channel 119, a communications interface 117 on video system 103 selects less bitstream data to transmit to video system 101.

In a heterogeneous networking environment the bandwidth of the channels can vary significantly but the scalability of MPEG-4 FGS enables the video systems 101, 103 to transmit the highest quality video given the available bandwidth. However, in a real-time video system, such as the video conferencing system of FIG. 1A, a low end-to-end latency cannot be achieved if the codec must perform processing-intensive calculations on each end of the transmission. As described below, in one embodiment, the present invention reduces the amount of processing required to encode the video stream by using a fractional part of existing quantized video coefficients as frequency-ordered enhancement layers to eliminate a separate frequency weighting component traditionally used to reduce flickering. For environments in which motion compensation is not critical, such as video conferences, the use of the fractional part as the frequency-ordered enhancement layers also allows the reuse of decoding components.

The embodiments of the present invention are not limited to use with low latency video systems but is equally applicable to streaming video systems, such as illustrated in FIG. 1B. An encoder 133 in an encoding system (not shown) encodes a video signal from a camera 131 into base and enhancement layer bitstreams, which are stored on a storage device 135. When a user requests the video, a server 137 reads the bitstreams from the storage device 135, determines the bandwidth of the communications link 139 to the playback computer 141, and transmits an amount of bitstream data that is supported by the bandwidth. A decoder 143 in the playback system 141 decodes the bitstream to produce the video shown to the user on display 145. Incorporation of the invention reduces the processing requirements of the encoder 133 and decoder 143 and thus that of both the encoding and the playback systems when producing and displaying high quality video.

While various system configurations have been described to illustrate the use of encoder and decoders, it will be appreciated that the invention is not limited to these configurations. For example, the encoding system and the server 137 of FIG. 1B may be the same or different systems. Furthermore, any or all of the video systems, the encoding system, the server, and the playback system may be general purpose computers, such as described below in conjunction with FIG. 10, or specially-designed systems.

Figure 2:
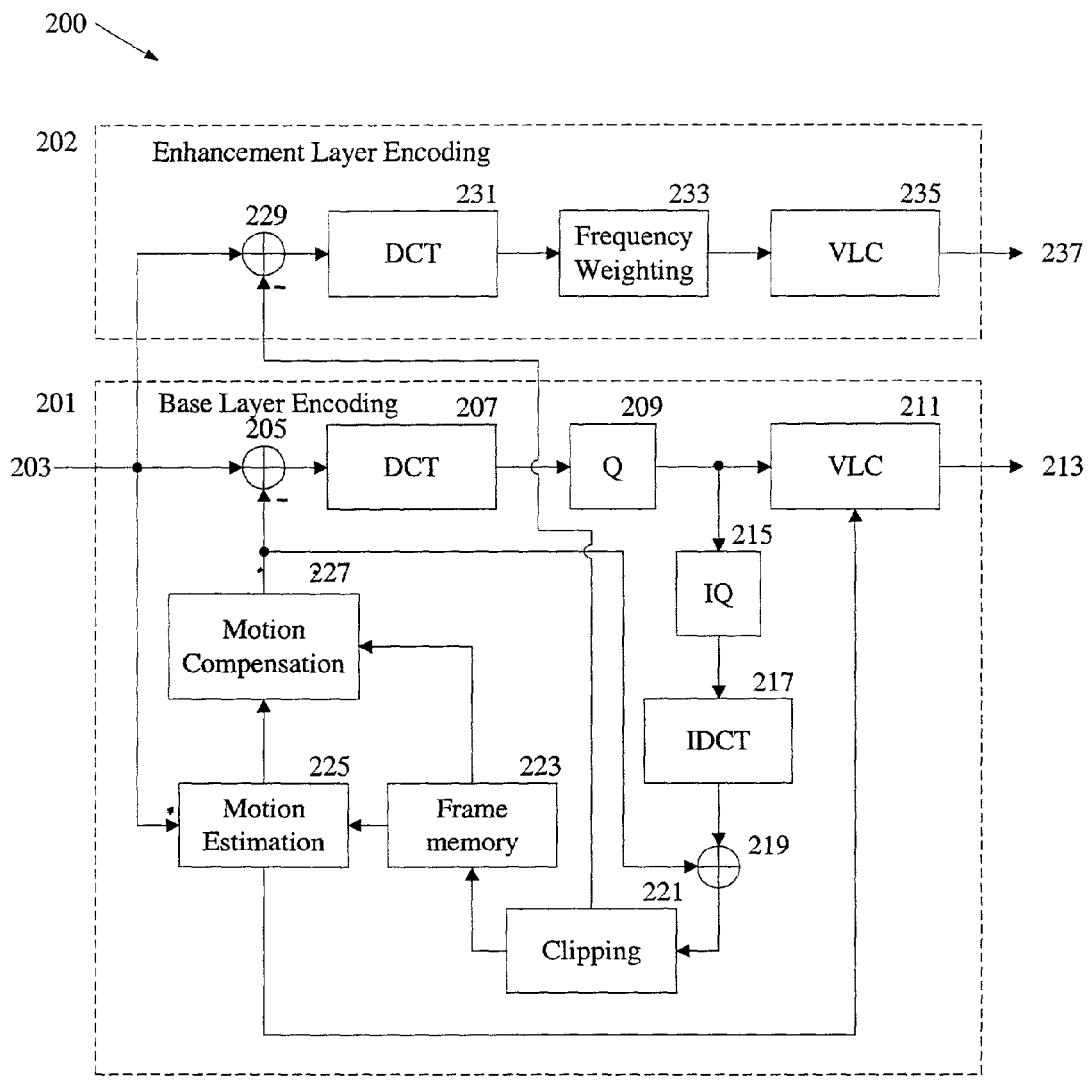
FIG. 2 is a block diagram illustrating a prior art encoding structure.
Figure 3:
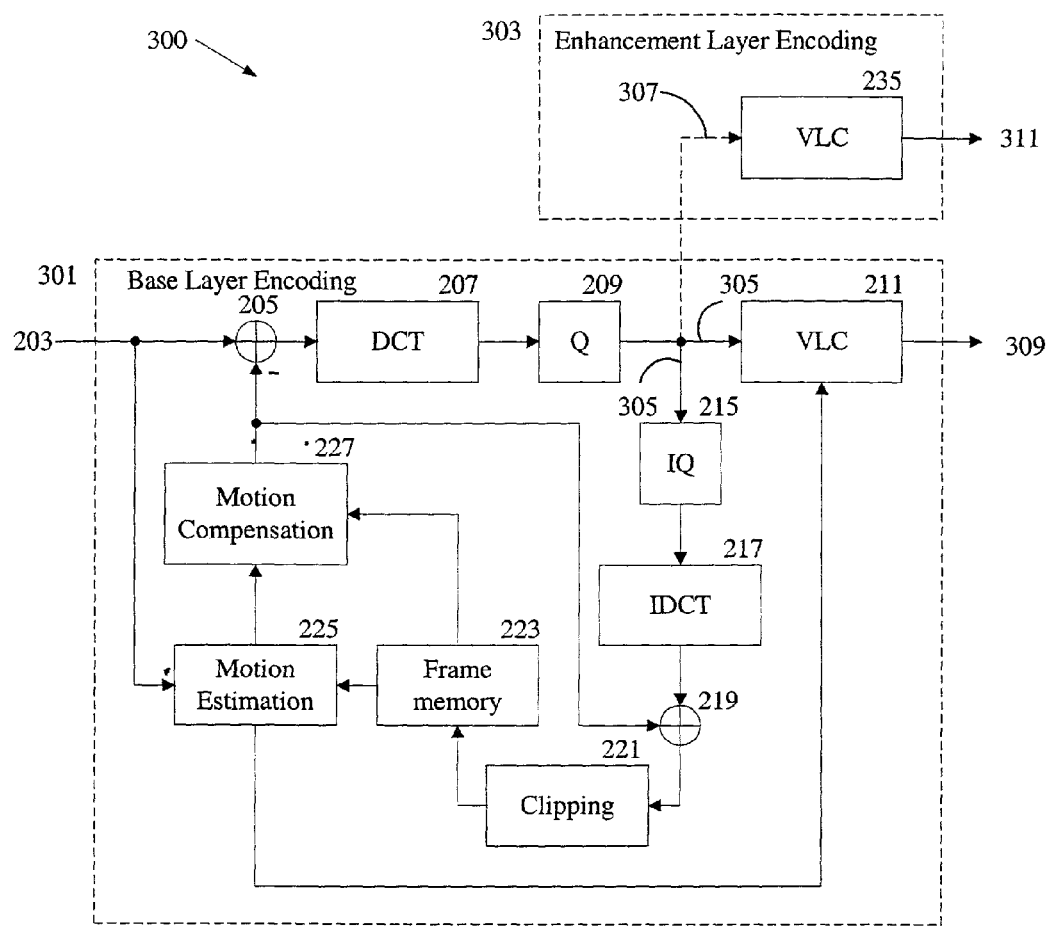
FIG. 3 is a block diagram illustrating one embodiment of an encoding structure according to the invention.
Figure 4:
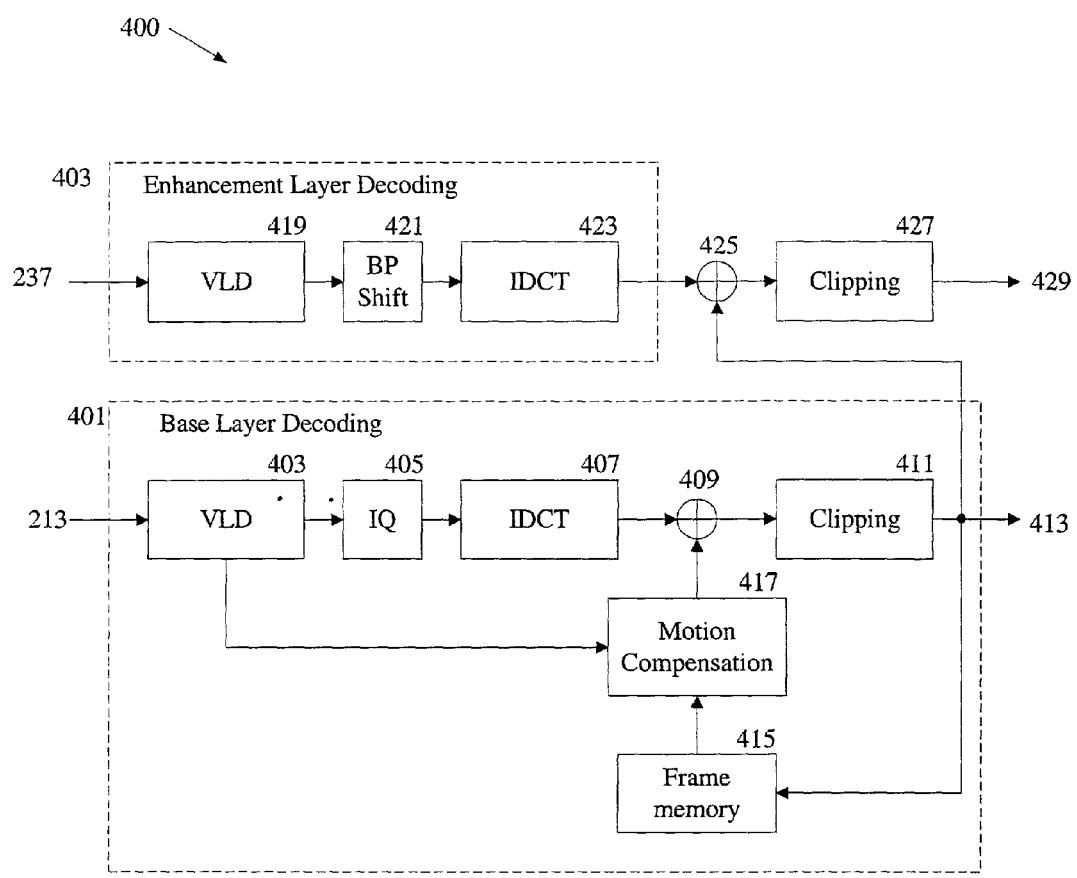
FIG. 4 is a block diagram illustrating a prior art decoding structure corresponding to the encoding structure of FIG. 2.
Figure 5:
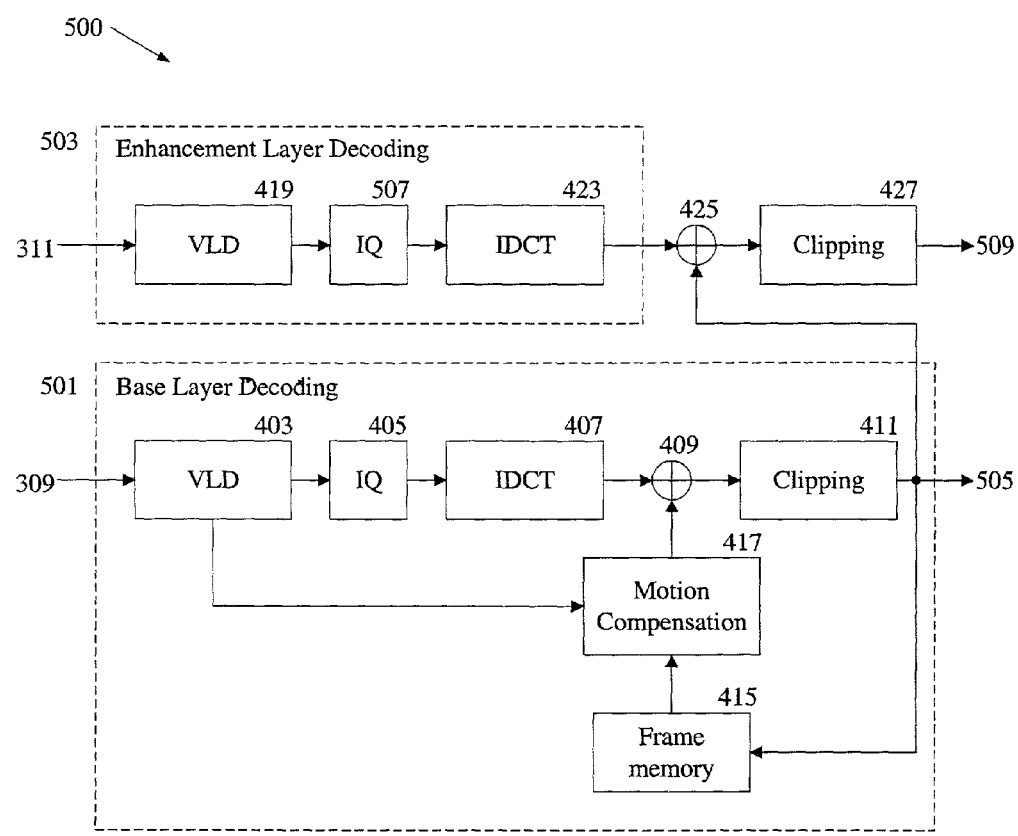
FIG. 5 is a block diagram illustrating a decoding structure corresponding to the encoding structure of FIG. 3.

The use of the fractional part of the quantization as the enhancement layer in an FGS codec is now described in conjunction with FIGS. 3 and 5, with reference to prior art encoding and decoding structures in FIGS. 2 and 4. The FGS encoding structure 200 of FIG. 2 encodes a series of video frames 203 to produce a base layer bitstream 213 plus a bitstream of one or more enhancement layers 237. A base layer encoding structure 201 employs a discrete cosine transform (DCT) 207, quantization (Q) 209, and variable length coding (VLC) 211 components. The encoding structure also includes a feedback "reconstruction" loop that subtracts 205 a reconstructed base layer from an incoming frame 203 to remove temporal redundancies from the incoming frames. The reconstruction loop performs an inverse quantization (IQ) 215 and inverse discrete cosine transform (IDCT) 217 on the output of Q 209 to reverse the IQ 215 and DCT 217 operations. A clipping component 221 modifies the output of the IDCT component 217 to within a valid range, if needed, and the output from the clipping component 221 is stored in a frame memory 223. The data in the frame memory 223 is processed to compensate for motion (using motion estimation (ME) 225 and motion compensation (MC) 227 components) to produce the reconstructed base layer.

An enhancement layer encoding structure 202 produces the enhancement layers by subtracting 229 the clipping component output from the incoming frame 203 and transforming the difference into coefficients in the DCT domain (DCT 231). When lower frequency layers are transmitted first, the flickering effect is reduced, and so a frequency weighting (FW) 233 shifts each DCT coefficient using a FW matrix to arrange the individual enhancement layers in frequency order. The ordered enhancement layers are processed through a VLC 235 to produce the enhancement layer bitstream 237.

It can be shown that the FW matrix is equivalent to a quantization matrix with a stepsize of a power of two and that a quantization matrix that satisfies the following equation is functionally equivalent to the FW matrix:

$$\frac{E(|\Delta x|)}{Qx} \geq \frac{E(|\Delta y|)}{Qy} \text{ where } Qx \leq Qy \qquad (1)$$

with $Q_x$ and $Q_y$ being the quantization stepsize of the low and high frequency DCT coefficients, respectively, and $\Delta x$ and $\Delta y$ representing the remainder of low and high frequency DCT coefficients, respectively. Assuming a base layer quantization matrix having the above properties in the Q component 209, and the IDCT 217 and DCT 231 having infinite precision, the fractional part of the quantized base layer DCT coefficients is functionally equivalent to the output of the frequency weighting component 233.

While a quantization matrix has been described that creates a fractional part equivalent to frequency-ordered enhancement layers, one of skill in the art will immediately recognize that other embodiments of encoding structures may require alternate quantization matrices that create fractional parts equivalent to enhancement layers ordered according to other criteria or enhancements layers that are not arranged in any particular order. Such alternate quantization matrices are considered within the scope of the invention.

Thus, the enhancement layer encoding structure 202 can be modified as illustrated in FIG. 3. An appropriate quantization matrix is incorporated into Q 209 and the quantized base layer DCT coefficients are parsed into their integer parts 305 and fractional parts 307. The integer parts 305 are input into the VLC 211 to produce a base layer bitstream 309 and into the reconstruction loop. The fractional parts 307 are variable length encoded 235 in an enhancement layer encoding structure 303 to produce an enhancement layer bitstream 311. Each enhancement layer may be represented by one or more binary decimal positions within each fractional part 307. The fractional parts 307 may not be able to be represented by a finite number of binary digits and some bits may need to be truncated. Therefore, in one embodiment, a maximum number to keep is based on the capacity of the system on which the encoding structure is implemented. In an alternate embodiment, as many bits as possible are kept, which may vary from time to time depending on the load on the system. It will be appreciated that the stepsize of the quantization matrix may be any integer value N, and the resulting integer part will be a value from 0 to N−1.

A prior art decoding structure 400 corresponding to the prior art encoding structure 200 is illustrated in FIG. 4. A base layer decoding structure 401 reverses the operations of the encoding structure 200 on the base layer bitstream 213 using a variable length decoder (VLD) 403, inverse quantization (IQ) 405 and an inverse discrete cosine transform (IDCT) 407. A feedback "prediction" loop adds 409 some or all of the temporal redundancies removed in the reconstruction loop in the base layer encoding structure 201 to create a restored base layer. Clipping 411 is performed on the restored base layer and the result is (optionally) output as the base layer 413 and stored in a frame memory 415. A motion compensation (MC) component 417 is also included in the prediction loop. The enhancement bitstream 237 is decoded in structure 403 using a VLD 419, a bit plane shifter (BP shift) 421 to reverse the FW operation 233 and an IDCT 423. The base layer 413 is added 425 to the resulting enhancement layers, clipped 427, and output as the video frame 429.

Because the enhancement bitstream 311 produced by the encoder 300 in FIG. 3 is derived from the fractional parts of the quantized DCT coefficients computed at the base layer, the enhancement layer decoding structure 403 can be modified as shown in FIG. 5. After variable length decoding 419, an inverse quantization (IQ) component 507 is used to reverse the quantization 209 that produced the fractional parts. The IQ 507 replaces the BP shift component 421 shown in FIG. 4.

It will be appreciated that corresponding DCT/IDCT, Q/IQ and VLC/VLD components are used within the encoding/decoding structures illustrated herein. Additionally, common components are given different reference numbers to indicate different instances of a component. For example, one of skill in the art will immediately recognize that IQ 507 and IQ 405 in FIG. 5 perform the same operations but cannot be the same IQ component because the enhancement layer signal would flow into the prediction loop and result in error drifting.

Figure 6A:
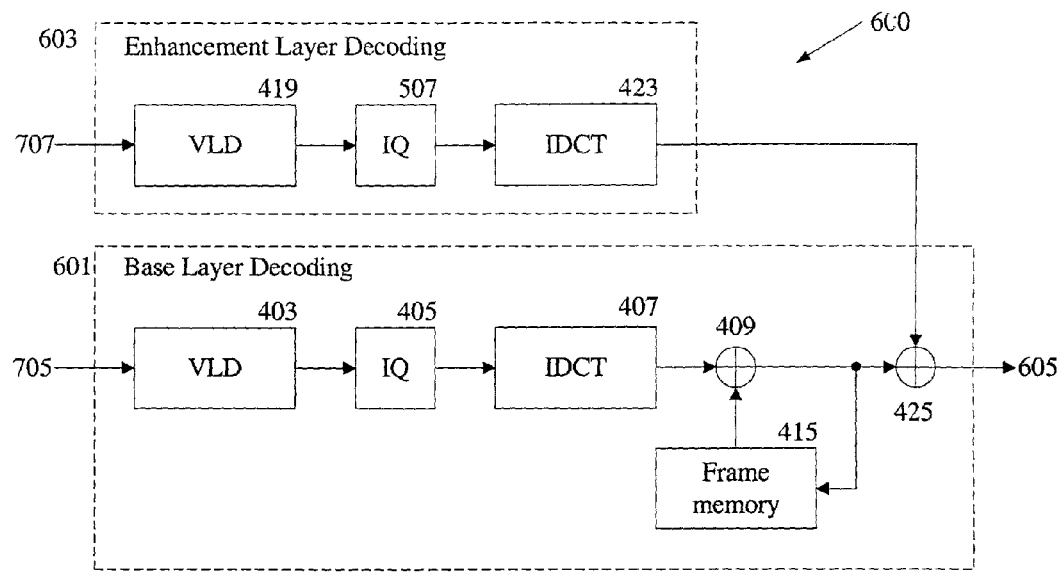
FIGS. 6A-C are block diagram illustrating alternate embodiments of a decoding structure according to the invention.
Figure 7A:
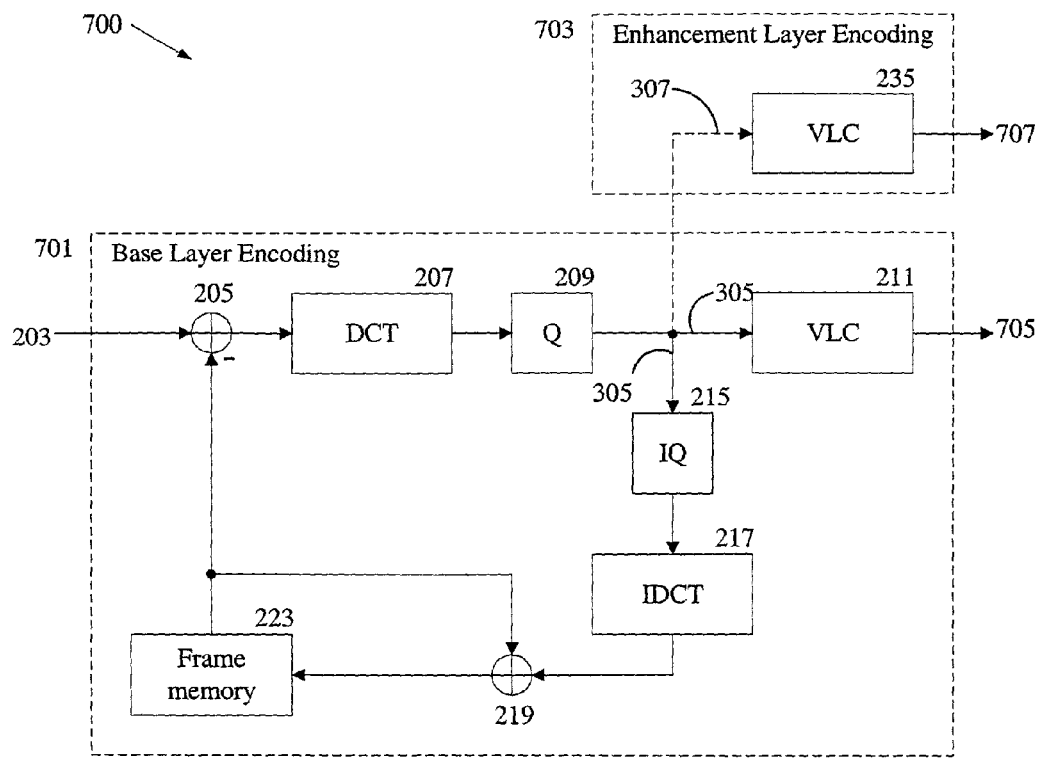
FIGS. 7A-C are block diagrams illustrating encoding structures corresponding to the decoding structures of FIGS. 6A-C.
Figure 6B:
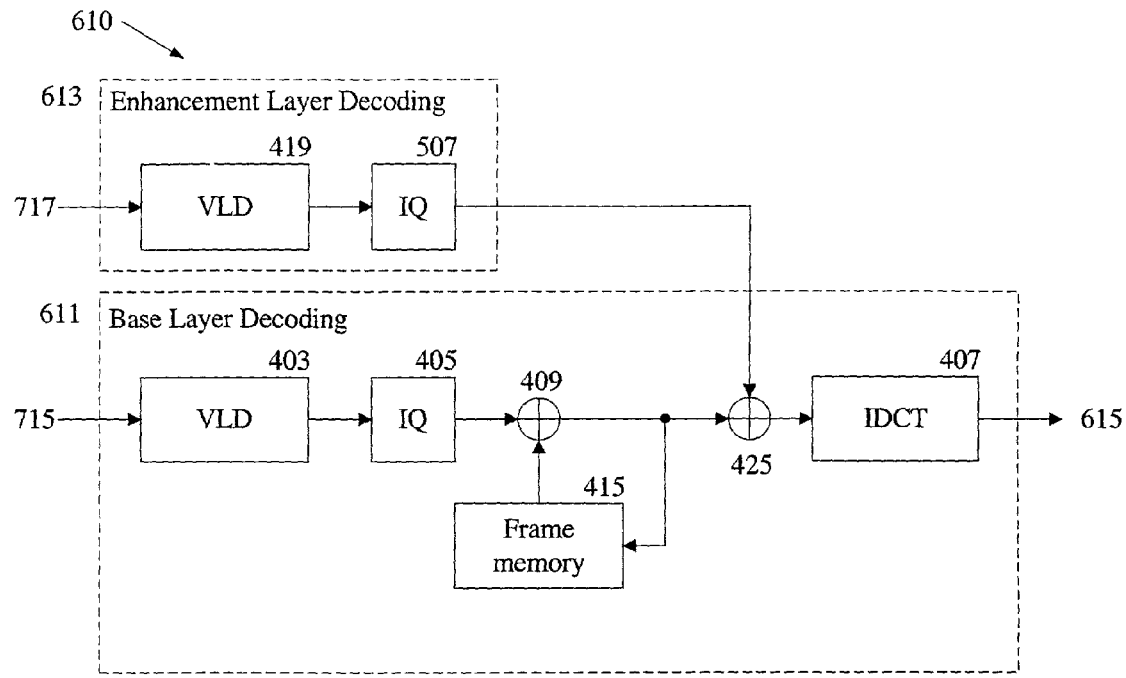
Figure 6C:
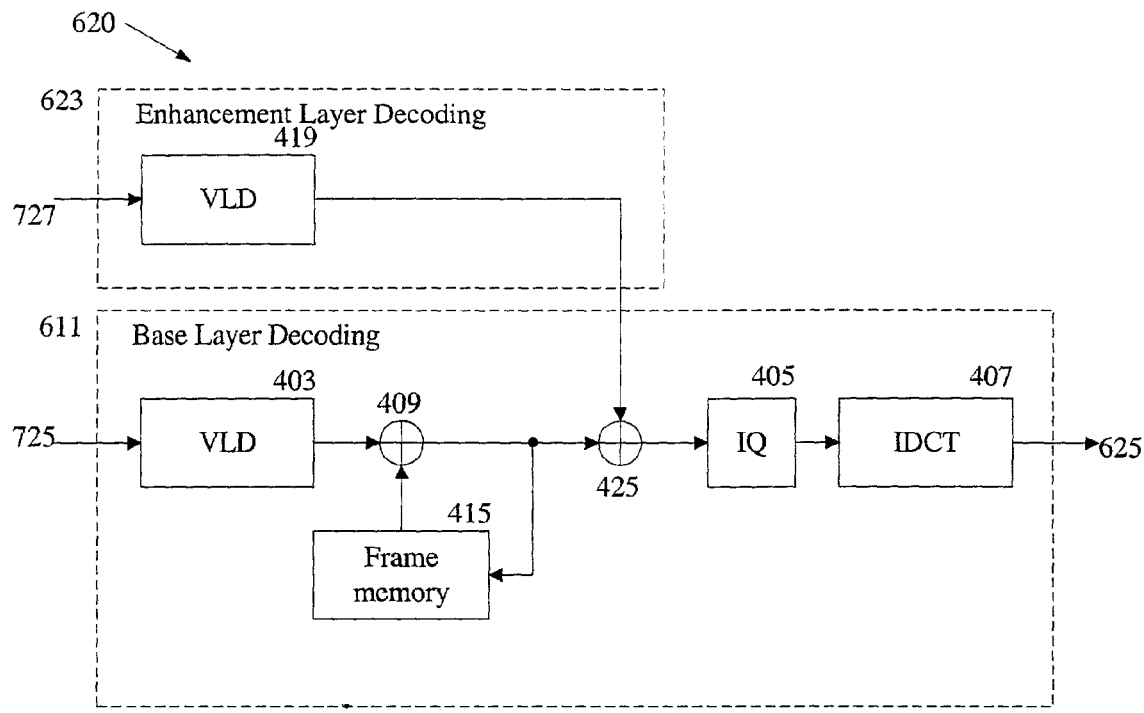
Figure 7C:
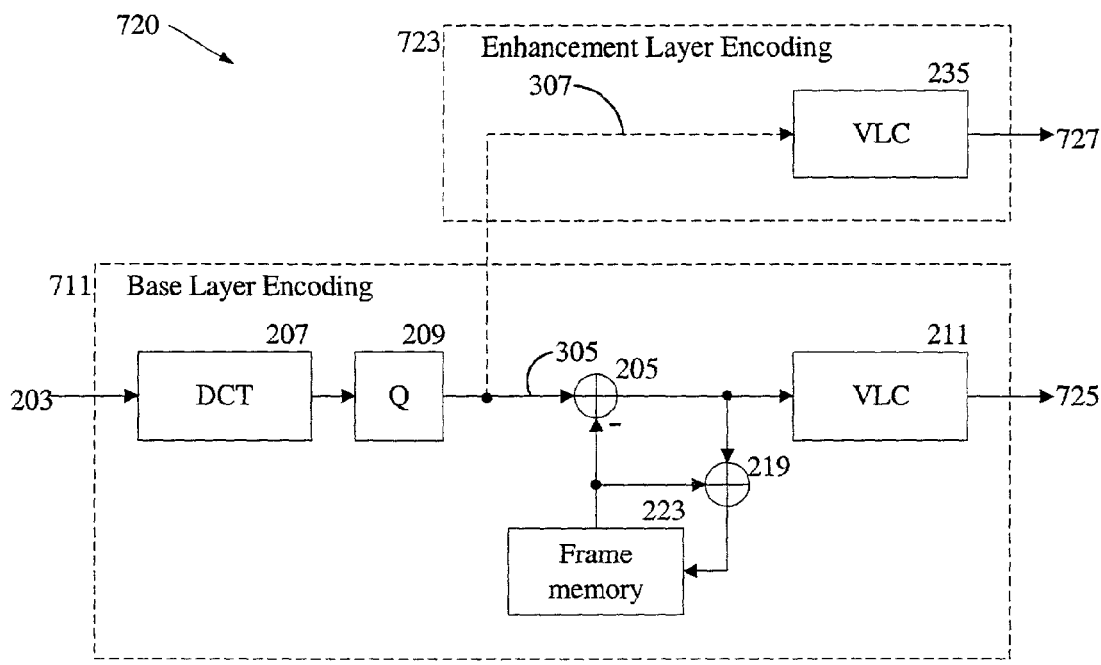

When motion compensation for the video frames is not critical, the encoding and decoding structures of FIGS. 3 and 5 may be modified further as illustrated in FIGS. 6A-C and 7A-C, and the particular embodiments illustrated in FIGS. 6B and 6C allow the reuse of common decoding components without causing error drifting. In each of the following embodiments, the decoding structure is first described and then the corresponding encoding structure. Clipping components are not shown for ease in illustration but one of skill in the art will immediately understand where clipping would be applied.

Assuming zero-motion vectors, the prediction loop in the base layer decoding structure 501 can be treated as a linear time invariant loop and does not require the MC component 417, resulting in the base layer decoding structure 601 illustrated FIG. 6A. Furthermore, the addition component 425 can be moved into the base layer decoding structure 601, eliminating output of the base layer alone when there are enhancement layers present. The corresponding encoding structure 700 illustrated in FIG. 7A eliminates the ME 225 and MC 227 components in the reconstruction loop since the reconstruction loop is similarly treated as a linear time invariant loop.

Figure 7B:
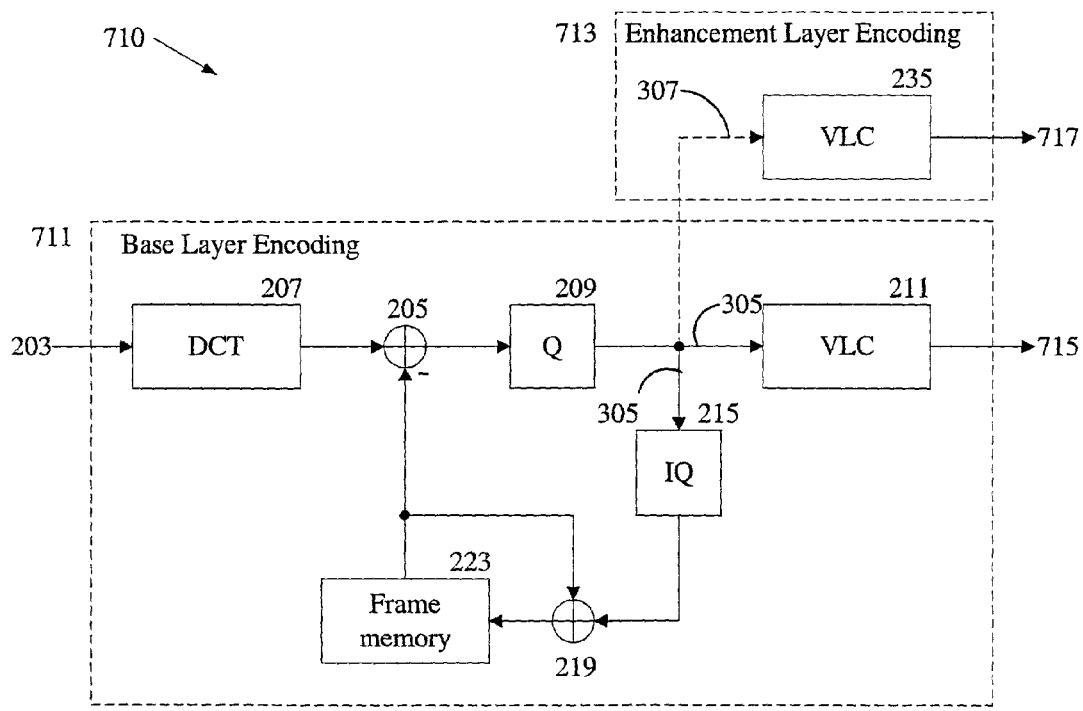

In another embodiment, the exchange law of linear time invariant systems allows the prediction loop in the base layer decoding structure to be exchanged with the IDCT 407 as illustrated in FIG. 6B. Because the IDCT 407 and the IDCT 423 of FIG. 6A are equivalent, exchanging the prediction loop with the IDCT 407 allows the use of a single IDCT without incurring error drifting problems. The corresponding encoding structure 710 is shown in FIG. 7B, in which the temporal redundancies are removed from the incoming frames 203 after the frames have been transformed into the DCT domain.

In a further embodiment, the prediction loop is moved before the IQ 405 as illustrated in FIG. 6C to allow reuse of the IQ 405 in the decoding structure 620 without introducing error drifting. Because the IQ 405 is not a linear time invariant system, the quantization parameters $Q_p$ used to encode the bitstreams 725, 727 (FIG. 7C) are transmitted to the decoding structure so the time variations of IQ 405 are known to the decoding structure 620. It will be appreciated that having $Q_p$ fixed or smoothly changing will enhance the efficiency of the decoding structure 620. A corresponding encoding structure 720 illustrated in FIG. 7C removes the temporal redundancies from the incoming frames 203 after the frames have been transformed and quantized.

Next, the particular methods of the invention are described in terms of executable instructions with reference to a series of flowcharts. Describing the methods by reference to a flowchart enables one skilled in the art to develop such instructions to carry out the methods within suitably configured processing units. The executable instructions may be written in a computer programming language or may be embodied in firmware logic. Furthermore, it is common in the art to speak of executable instructions as taking an action or causing a result. Such expressions are merely a shorthand way of saying that execution of the instructions by a computer causes the processor of the computer to perform an action or a produce a result.

FIGS. 8 and 9A-C illustrate the methods to be performed by a system to implement the operations of the encoding and decoding structures of the invention previously described. The embodiments of an encoding method are illustrated in a flowchart in FIG. 8, including all the acts (blocks) from 801 until 819. The embodiments of decoding methods are illustrated in flowcharts in FIGS. 9A-C, including all the acts from 901 until 935.

Figure 8:
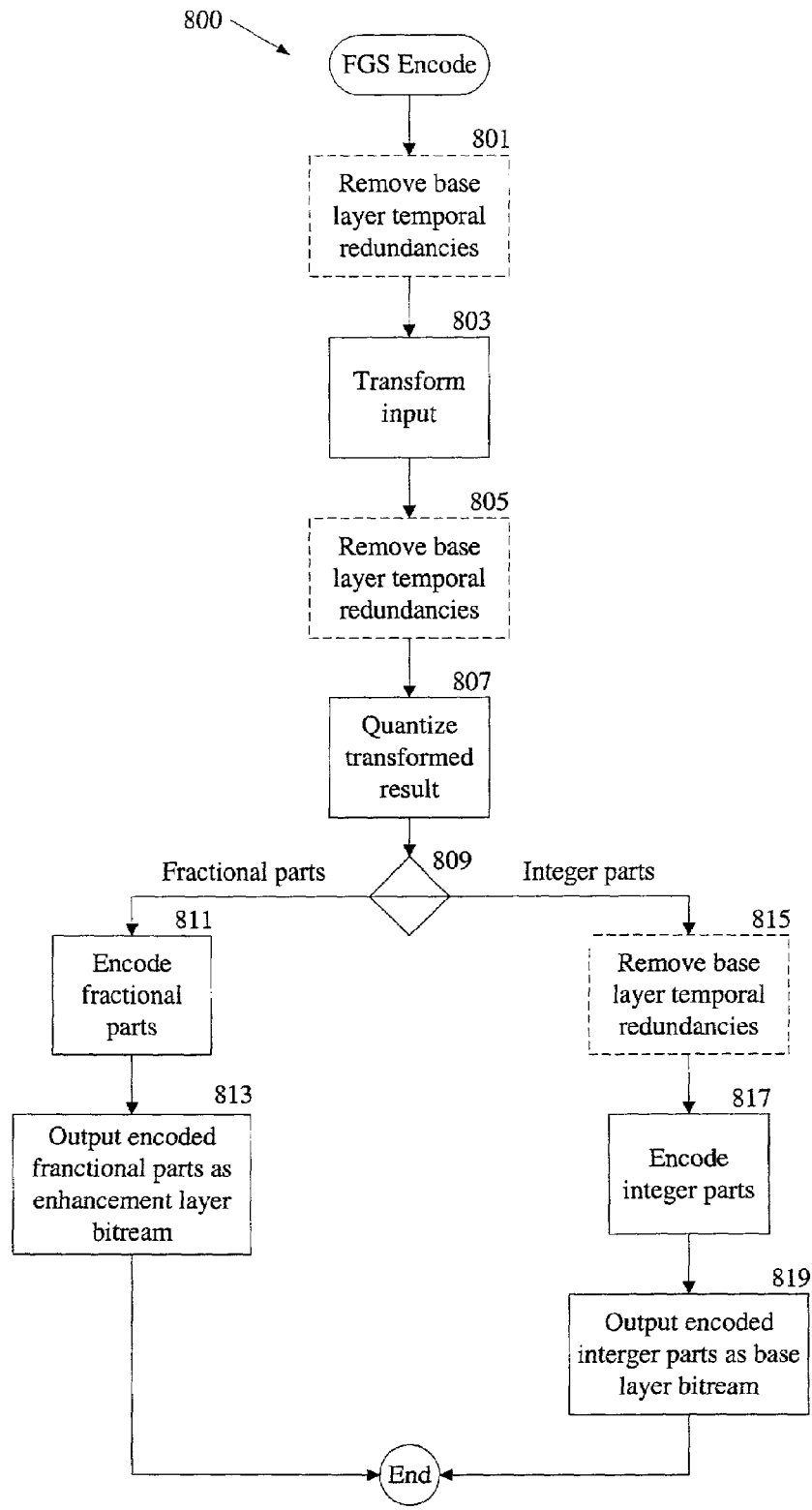
FIG. 8 is a flowchart of an method for performing the encoding operation of the encoding structures of FIGS. 7A-C.

Referring first to FIG. 8, the acts that cause a system to perform the operations of the encoding structures of FIGS. 3 and 7A-C are shown as FGS encoding method 800. Because the encoding structures of FIGS. 3 and 7A-C remove the temporal redundancies at different points in the encoding process, phantom blocks 801, 805 and 815 in FIG. 8 are used to represent the removal operation. For FIGS. 3 and 7A, temporal redundancy removal is performed at block 801; for FIG. 7B, at block 805; and for FIG. 7C, at block 815. The incoming frame is transformed (block 803) and the transformed result is quantized (block 807). The result of the quantization is parsed at block 809 into its fractional parts and its integer parts. The fractional parts are encoded (block 811), and the encoded fractional parts are output as the enhancement layer bitstream (block 813). The integer parts are encoded (block 817), and the encoded integer parts are output as the base layer bitstream (block 819).

Figure 9A:
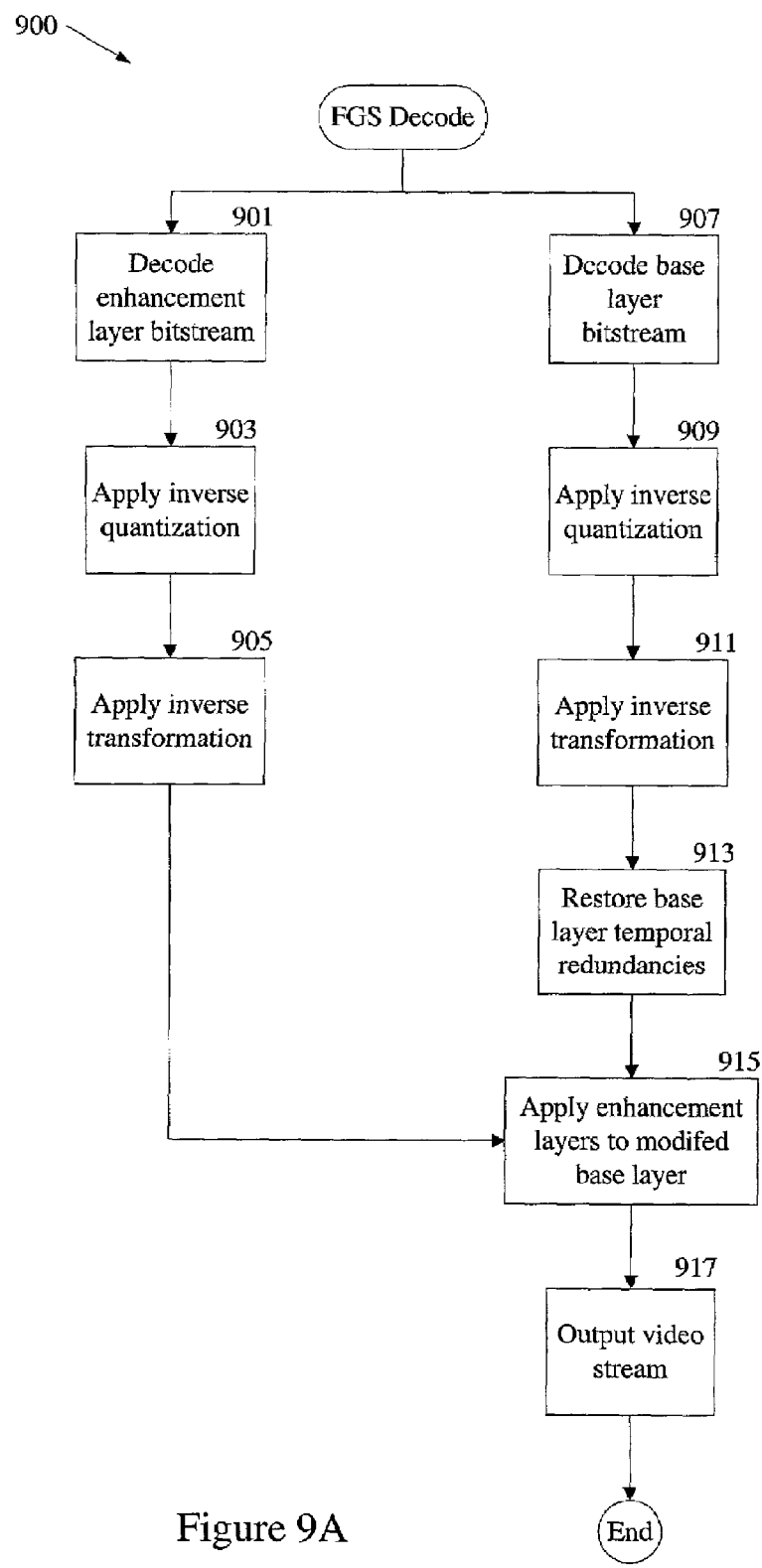
FIGS. 9A-C are flowcharts of methods for performing the decoding operations of decoding structures of FIG. 6A-C.

An FGS decode method 900 is illustrated in FIG. 9A that causes a system to perform the operations of the decode structures shown in FIGS. 5 and 6A. The enhancement layers are decoded (block 901), an inverse quantization (block 903) and an inverse transformation (block 905) are applied. The output of block 905 is applied into the base layer at block 915 as described below. Similarly, the base layer is decoded (block 907) and an inverse quantization (block 909) and an inverse transformation (block 911) applied. Some or all of the base layer temporal redundancies are restored to reconstruct the base layer (block 913). At block 915, the enhancement layers from block 905 are applied to the reconstructed base layer. The resulting video stream is output at block 917.

Figure 9B:
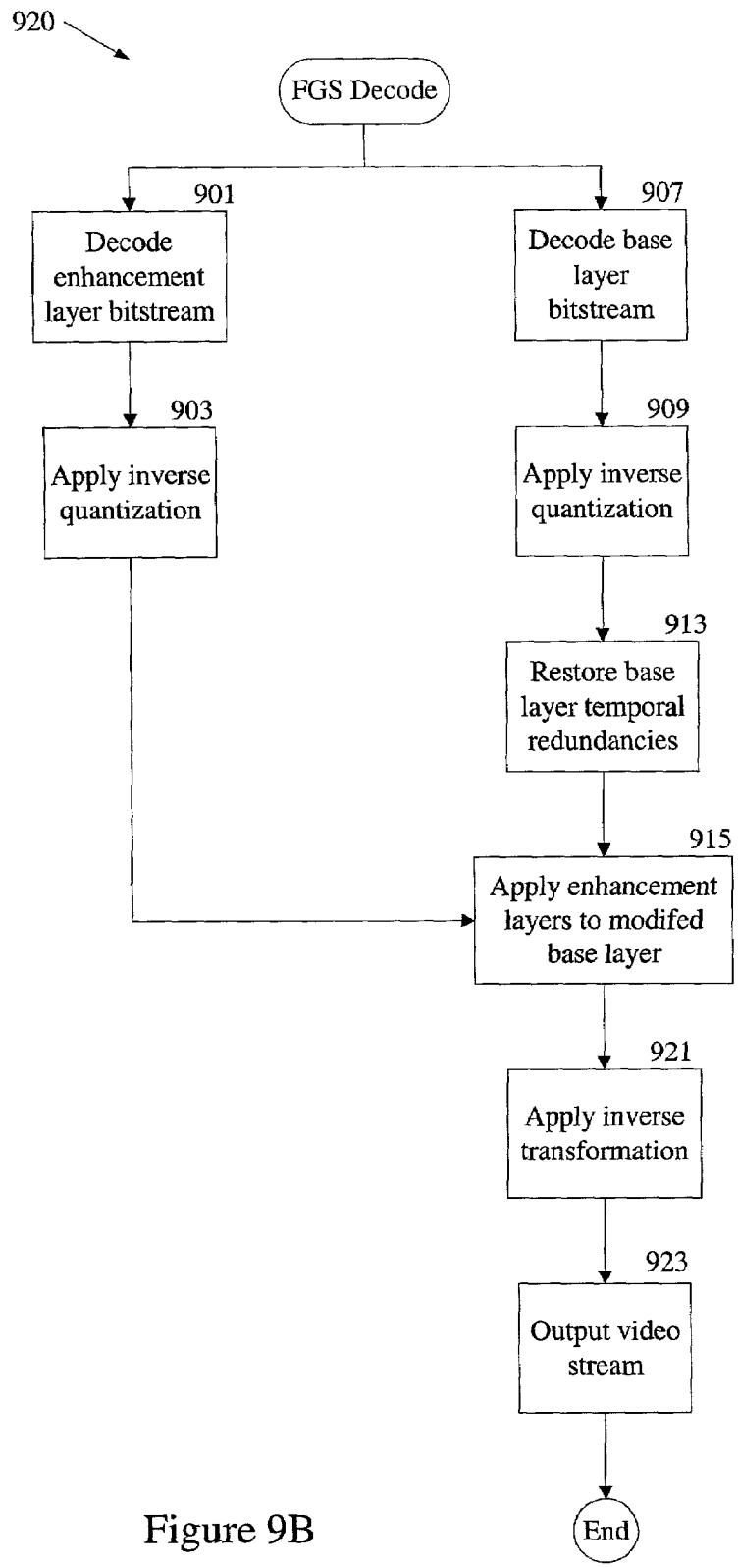

Turning now to FIG. 9B, an FGS decode method 920 is described that causes a system to perform the operations of the decoding structures of FIG. 6B. Similar to method 900, method 920 decodes the enhancement layer data stream at block 901 and applies an inverse quantization at block 903. The output of block 903 is applied to the base layer at block 915 as described below. As in FIG. 9A, the base layer bitstream is decoded at block 907 and the inverse quantization is applied at block 909. The base layer temporal redundancies are restored at block 913 and the enhancement layers from block 903 are applied to the modified base layer at block 915. In this case, the inverse transformation is applied to the combined base layer and enhancement layers (block 921) and the result is output as the video stream (block 923).

Figure 9C:
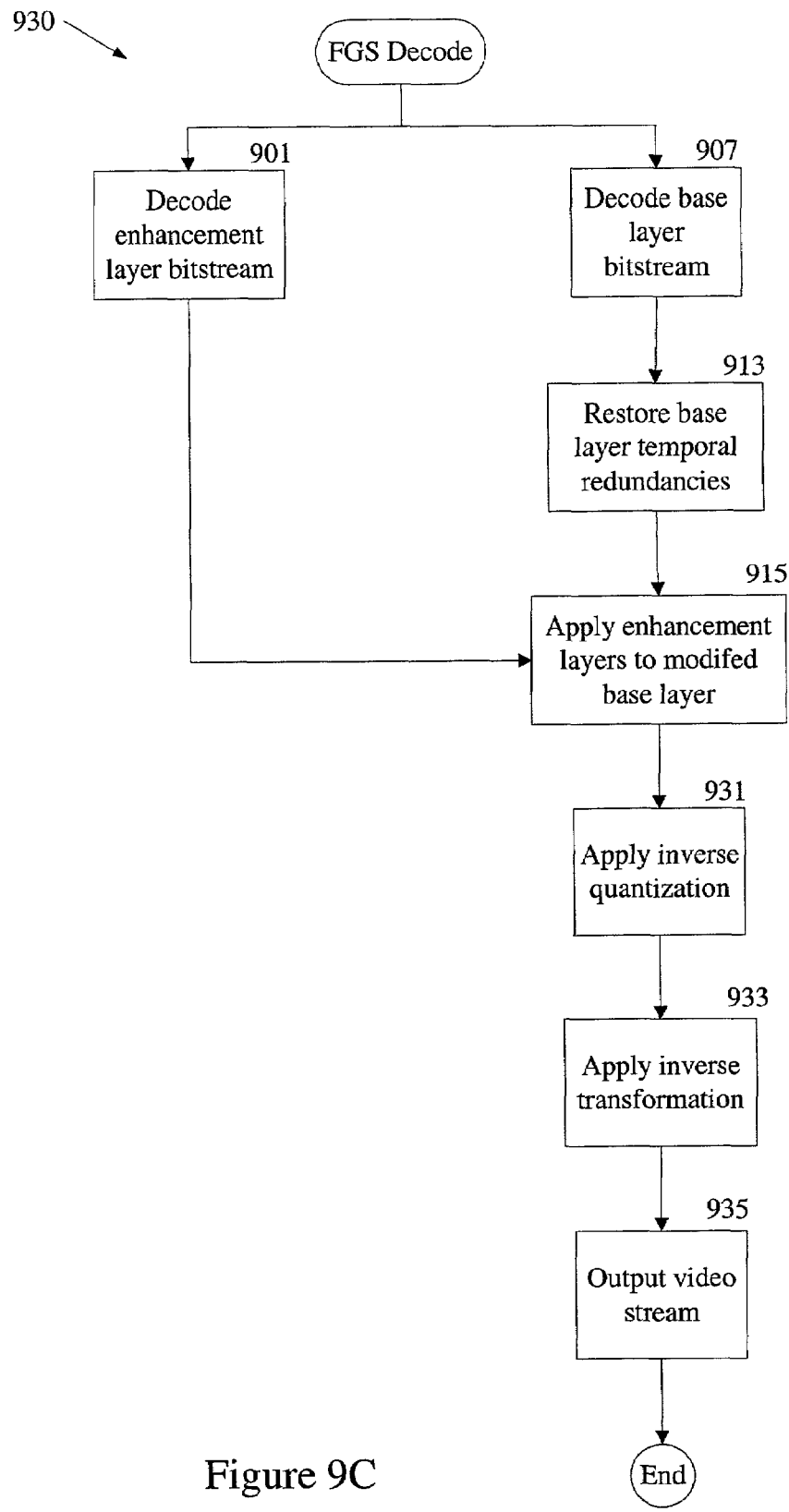

As shown in FIG. 9C, an FGS decode method 930 that that causes a system to perform the operations of the decoding structures in FIGS. 6C decodes the enhancement layer data stream at block 909, leaving the inverse quantization and the inverse transformation to be applied to the combined base layer and enhancement layers at blocks 931 and 933, with the resulting video stream being output at 935. Blocks 907, 913 and 915 perform the processes described above for those blocks in FIGS. 9A and 9B.

Figure 10:
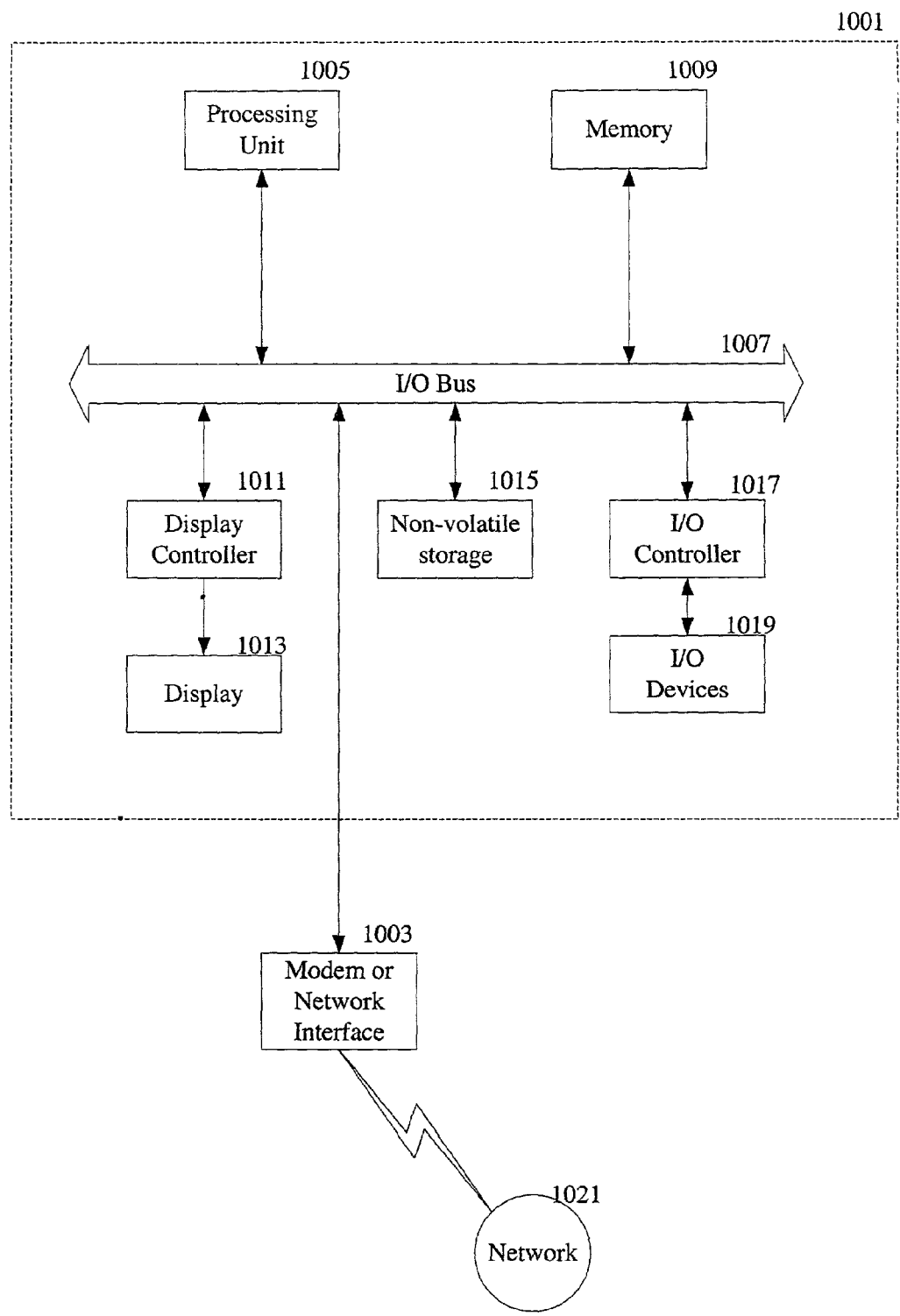
FIG. 10 is a diagram of one embodiment of a computer system in which a encoder or decoder according to the invention may incorporated.

The following description of FIG. 10 is intended to provide an overview of computer hardware environments in which the encoding/decoding structures and methods of the invention can be implemented, but is not intended to limit the applicable environments. FIG. 10 shows one example of a conventional computer system 1001 containing a processing unit 1005 and a memory 1009 coupled to the processor 1005 by a bus 1007. Memory 1009 can be dynamic random access memory (DRAM) and can also include static RAM (SRAM). The bus 1007 couples the processor 1005 to the memory 1009 and also to non-volatile storage 1015, to display controller 1011, to the input/output (I/O) controller 1017, and to a modem or network interface 1003. The display controller 1011 controls in the conventional manner a display on a display device 1013 which can be a cathode ray tube (CRT) or liquid crystal display. The input/output devices 1019 can include a keyboard, disk drives, printers, a scanner, and other input and output devices, including a mouse or other pointing device. The input/output devices 1019 may include a digital image input device, such as a digital camera, that is coupled to the I/O controller 1017 in order to allow images from the digital image input device to be input into the computer system 1001. The modem/network interface 1003 enables the computer 1001 to communicate with other computers or devices on a network 10021. The display controller 1011, the I/O controller 1017, and the modem/network interface 1003 can be implemented with conventional well known technology. The non-volatile storage 1015 is often a magnetic hard disk, an optical disk, or another form of storage for large amounts of data. Some of this data is often written, by a direct memory access process, into memory 1009 during execution of software in the computer system 1001. One of skill in the art will immediately recognize that the term "computer-readable medium" or "machine-readable medium" includes any type of storage device that is accessible by the processor 1005 and also encompasses a carrier wave that encodes a data signal.

It will be appreciated that the computer system 1001 is one example of many possible computer systems which have different architectures. One of skill in the art will immediately appreciate that the invention can be practiced with other computer system configurations, including handheld devices, multiprocessor systems, microprocessor-based or programmable consumer electronics, networked personal computers, minicomputers, mainframe computers, and the like. A typical computer system will usually include at least a processor, memory, and a bus coupling the memory to the processor.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, although the invention is described in terms of particular FGS encoding and decoding structures, the concept of replacing the enhancement layer frequency weighting matrix with the base layer quantization matrix is applicable to other coding algorithms. Therefore, it is manifestly intended that this invention be limited only by the following claims and equivalents thereof.

What is claimed is:

1. A method comprising:
quantizing coefficients into quantized values, each quantized value for a corresponding coefficient having an integer part and a fractional part, the integer part representing a base layer for the corresponding coefficient and the fractional part representing enhancement layers for the corresponding coefficient, the coefficients representing input data; and
encoding the fractional parts into an enhancement layer bitstream.

2. The method of claim 1 further comprising:
encoding the integer parts into a base layer bitstream.

3. The method of claim 1 further comprising:
transforming an input into the coefficients.

4. The method of claim 3 further comprising:
removing temporal redundancies exhibited by the input.

5. The method of claim 1, wherein the enhancement layers are frequency ordered.

6. A method comprising:
decoding an enhancement layer bitstream into quantized fractional values representing enhancement layers, each quantized fractional value being a fractional part of a quantization value generated from coefficients representing input data;
applying an inverse quantization to the quantized fractional values to create coefficients representing the enhancement layers;
applying an inverse transformation to the coefficients to create the enhancement layers; and
combining the enhancement layers with a base layer.

7. The method of claim 6 further comprising:
adding temporal redundancies to the base layer.

8. A method comprising:
decoding an enhancement layer bitstream into quantized fractional values representing enhancement layers, each quantized fractional value being a fractional part of a quantization value generated from coefficients representing input data;
applying an inverse quantization to the quantized fractional values to create coefficients representing the enhancement layers;
combining the coefficients representing the enhancement layers with coefficients representing a base layer; and applying an inverse transformation to the combined coefficients.

9. The method of claim 8 further comprising:
adding temporal redundancies to the coefficients representing the base layer.

10. A method comprising:
decoding an enhancement layer bitstream into quantized fractional values representing enhancement layers, each quantized fractional value being a fractional part of a quantization value generated from coefficients representing input data;
combining the quantized fractional values representing enhancement layers with quantized integer values representing a base layer;
applying an inverse quantization to the combined quantized values to create coefficients; and
applying an inverse transformation to the coefficients.

11. The method of claim 10 further comprising:
adding temporal redundancies to the quantized integer values representing the base layer.

12. A computer-readable medium embodied with a computer program, which when executed by a computer, causes the computer to perform operations comprising:
quantizing coefficients into quantized values, each quantized value for a corresponding coefficient having an integer part and a fractional part, the integer part representing a base layer for the corresponding coefficient and the fractional part representing enhancement layers for the corresponding coefficient, the coefficients representing input data; and
encoding the fractional parts into an enhancement layer bitstream.

13. The computer-readable medium of claim 12, wherein the operations further comprise:
encoding the integer parts into a base layer bitstream.

14. The computer-readable medium of claim 12, wherein the operations further comprise:
transforming an input into the coefficients.

15. The computer-readable medium of claim 14, wherein the operations further comprise:
removing temporal redundancies exhibited by the input.

16. The computer-readable medium of claim 12, wherein the enhancement layers are frequency ordered.

17. A computer-readable medium embodied with a computer program, which when executed by a computer, cause the computer to perform operations comprising:
decoding an enhancement layer bitstream into quantized fractional values representing enhancement layers, each quantized fractional value being a fractional part of a quantization value generated from coefficients representing input data;
applying an inverse quantization to the quantized fractional values to create coefficients representing the enhancement layers;
applying an inverse transformation to the coefficients to create the enhancement layers; and
combining the enhancement layers with a base layer.

18. The computer-readable medium of claim 17, wherein the operations further comprise:
adding temporal redundancies to the base layer.

19. A computer-readable medium embodied with executable program instructions, which when executed by a processing unit of a computer, cause the processing unit to perform operations comprising:
decoding an enhancement layer bitstream into quantized fractional values representing enhancement layers, each quantized fractional value being a fractional part of a quantization value generated from coefficients representing input data;
applying an inverse quantization to the quantized fractional values to create coefficients representing the enhancement layers;
combining the coefficients representing the enhancement layers with coefficients representing a base layer; and
applying an inverse transformation to the combined coefficients.

20. The computer-readable medium of claim 19, wherein the operations further comprise:
adding temporal redundancies to the coefficients representing the base layer.

21. A computer-readable medium providing executable program instructions, which when executed by a processing unit of a computer, cause the processing unit to perform operations comprising:
decoding an enhancement layer bitstream into quantized fractional values representing enhancement layers, each quantized fractional value being a fractional part of a quantization value generated from coefficients representing input data;
combining the quantized fractional values representing enhancement layers with quantized integer values representing a base layer;
applying an inverse quantization to the combined quantized values to create coefficients; and
applying an inverse transformation to the coefficients.

22. The computer-readable medium of claim 21, wherein the operations further comprise:
adding temporal redundancies to the quantized integer values representing the base layer.

23. A system comprising:
a processor;
a memory coupled to the processor though a bus; and
an encoding process executed from the memory by the processor to cause the processor to quantize coefficients into quantized values, each quantized value for a corresponding coefficient having an integer part and a fractional part, the integer part representing a base layer for the corresponding coefficient and the fractional part representing enhancement layers for the corresponding coefficient, the coefficients representing input data, and to encode the fractional parts into an enhancement layer bitstream.

24. The system of claim 23, wherein the encoding process further causes the processor to encode the integer parts into a base layer bitstream.

25. The system of claim 23, wherein the encoding process further causes the processor to transform an input into the coefficients.

26. The system of claim 25, wherein the encoding process further causes the processor to remove temporal redundancies exhibited by the input.

27. The system of claim 23, wherein the enhancement layers are frequency ordered.

28. A system comprising:
a processor;
a memory coupled to the processor though a bus; and
a decoding process executed from the memory by the processor to cause the processor to decode an enhancement layer bitstream into quantized fractional values representing enhancement layers, each quantized fractional value being a fractional part of a quantization value generated from coefficients representing input data, to apply an inverse quantization to the quantized fractional values to create coefficients representing the enhancement layers, to apply an inverse transformation to the coefficients to create the enhancement layers, and to combine the enhancement layers with a base layer.

29. The system of claim 28, wherein the decoding process further cause the processor to add temporal redundancies to the base layer.

30. A system comprising:
a processor;
a memory coupled to the processor though a bus; and
a decoding process executed from the memory by the processor to cause the processor to decode an enhancement layer bitstream into quantized fractional values representing enhancement layers, each quantized fractional value being a fractional part of a quantization value generated from coefficients representing input data, to apply an inverse quantization to the quantized fractional values to create coefficients representing the enhancement layers, to combine the coefficients representing the enhancement layers with coefficients representing a base layer, and to apply an inverse transformation to the combined coefficients.

31. The system of claim 30, wherein the decoding process further cause the processor to add temporal redundancies to the coefficients representing the base layer.

32. A system comprising:
a processor;
a memory coupled to the processor though a bus; and
an decoding process executed from the memory by the processor to cause the processor to decode an enhancement layer bitstream into quantized fractional values representing enhancement layers, each quantized fractional value being a fractional part of a quantization value generated from coefficients representing input data, to combine the quantized fractional values representing enhancement layers with quantized integer values representing a base layer, to apply an inverse quantization to the combined quantized values to create coefficients, and to apply an inverse transformation to the coefficients.

33. The system of claim 32, wherein the decoding process further cause the processor to add temporal redundancies to the quantized integer values representing the base layer.

34. An apparatus comprising:
a transformation component coupled to an input to create coefficients from the input;
a quantization component coupled to the transformation component to create quantized values from the coefficients, each quantized value for a corresponding coefficient having an integer part and a fractional part, the integer part representing a base layer for the corresponding coefficient and the fractional part representing enhancement layers for the corresponding coefficient;
a first encoding component coupled to the quantization component to create a base layer bitstream from the integer parts; and
a second encoding component coupled to the quantization component to create a an enhancement layer bitstream from the fractional parts.

35. The apparatus of claim 34 further comprising:
a reconstruction loop coupled to the quantization component and to the input to remove temporal redundancies from the input.

36. The apparatus of claim 34 further comprising:
a reconstruction loop coupled to the quantization component and to the transformation component to remove temporal redundancies from the coefficients.

37. The apparatus of claim 34 further comprising:
a reconstruction loop coupled between the quantization component and the first encoding component to remove temporal redundancies from the integer parts.

38. The apparatus of claim 34, wherein the enhancement layers are frequency ordered.

39. An apparatus comprising:
a decoding component coupled to an enhancement layer bitstream to create quantized fractional values representing enhancement layers from the enhancement layer bitstream, each quantized fractional value being a fractional part of a quantization value generated from coefficients representing input data;
an inverse quantization component coupled to the decoding component to create coefficients from the quantized fractional values;
a first inverse transformation component coupled to the inverse quantization component to create the enhancement layers from the coefficients; and
an addition component coupled to the first inverse transformation component and further to a second inverse transformation component to combine the enhancement layers with a base layer from the second inverse transformation component.

40. The apparatus of claim 39 further comprising:
a prediction loop coupled to the second inverse transformation component to add temporal redundancies to the base layer.

41. An apparatus comprising:
a decoding component coupled to an enhancement layer bitstream to create quantized fractional values representing enhancement layers from the enhancement layer bitstream, each quantized fractional value being a fractional part of a quantization value generated from coefficients representing input data;
a first inverse quantization component coupled to the decoding component to create coefficients from the quantized values;
an addition component coupled to the first inverse quantization component and further to a second inverse quantization component to combine the coefficients from the first inverse quantization component with coefficients from the second inverse quantization; and
an inverse transformation component coupled to the addition component to create combined enhancement and base layers from the coefficients.

42. The apparatus of claim 41 further comprising:
a prediction loop coupled to the second inverse quantization component to add temporal redundancies to the coefficients from the second quantization component.

43. An apparatus comprising:
a first decoding component coupled to an enhancement layer bitstream to create quantized fractional values representing enhancement layers from the enhancement layer bitstream, each quantized fractional value being a fractional part of a quantization value generated from coefficients representing input data;
an addition component coupled to the first decoding component and further to a second decoding component to combine the quantized fractional values from the first decoding component with quantized integer values from the second decoding component;

an inverse quantization component coupled to the addition component to create coefficients from the quantized values; and an inverse transformation component coupled to the inverse quantization component to create combined enhancement and base layers from the coefficients.

44. The apparatus of claim 43 further comprising:

a prediction loop coupled to the second decoding component to add temporal redundancies to the quantized integer values.

* * * * *